US009124790B2

(12) United States Patent
Okuda

(10) Patent No.: US 9,124,790 B2
(45) Date of Patent: Sep. 1, 2015

(54) LENS APPARATUS AND IMAGE PICKUP APPARATUS

(71) Applicant: CANON KABUSHIKI KAISHA, Tokyo (JP)

(72) Inventor: Toshihiro Okuda, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 17 days.

(21) Appl. No.: 14/066,789

(22) Filed: Oct. 30, 2013

(65) Prior Publication Data

US 2014/0118608 A1 May 1, 2014

(30) Foreign Application Priority Data

Oct. 31, 2012 (JP) .................................. 2012-239749

(51) Int. Cl.
*H04N 5/225* (2006.01)
*G02B 7/10* (2006.01)

(52) U.S. Cl.
CPC ................ *H04N 5/2254* (2013.01); *G02B 7/10* (2013.01)

(58) Field of Classification Search
USPC .......................... 348/360, 345, 240.99, 240.3
See application file for complete search history.

(56) References Cited

U.S. PATENT DOCUMENTS

| 3,957,355 | A  | * | 5/1976  | Reinsch et al. ............... 359/705 |
| 2006/0056060 | A1 |   | 3/2006  | Ozaki et al. |
| 2006/0098303 | A1 | * | 5/2006  | Sato ............................... 359/700 |
| 2007/0280625 | A1 |   | 12/2007 | Kawaguchi |
| 2009/0122427 | A1 | * | 5/2009  | Nomura ......................... 359/819 |
| 2010/0157440 | A1 | * | 6/2010  | Iwasaki ......................... 359/699 |
| 2011/0122518 | A1 | * | 5/2011  | Musha et al. ................. 359/824 |
| 2012/0033962 | A1 | * | 2/2012  | Hyodo ........................... 396/544 |
| 2012/0105712 | A1 | * | 5/2012  | Terahara ....................... 348/360 |
| 2013/0215526 | A1 | * | 8/2013  | Park .............................. 359/824 |
| 2014/0063296 | A1 | * | 3/2014  | Ohya ......................... 348/240.3 |
| 2014/0253793 | A1 | * | 9/2014  | Kang et al. .................... 348/373 |

FOREIGN PATENT DOCUMENTS

| JP | 10-293238 A    | 11/1998 |
| JP | 2006-064930 A  | 3/2006  |
| JP | 2007-322709 A  | 12/2007 |

* cited by examiner

*Primary Examiner* — Sinh Tran
*Assistant Examiner* — Zhenzhen Wu
(74) *Attorney, Agent, or Firm* — Rossi, Kimms & McDowell LLP

(57) ABSTRACT

The lens apparatus includes a first lens barrel and a second lens barrel disposed on an image side further than an object side end portion of the first lens barrel so as to allow a movement of the first lens barrel in an optical axis direction, a positioning member attached to one lens barrel of the first and second lens barrels, and an elastic member disposed between the first and second lens barrels to bias the first lens barrel toward an object side. Another lens barrel of the first and second lens barrels is brought in contact with the positioning member with a biasing force from the biasing member, and thereby the first lens barrel is positioned with respect to the second lens barrel in a state where a movement of the first lens barrel on the image side due to an external force is allowed.

13 Claims, 4 Drawing Sheets

LENS APPARATUS AND IMAGE PICKUP APPARATUS

BACKGROUND OF THE INVENTION

1. Field of the Invention

The present invention relates to a lens apparatus including an external force absorption structure.

2. Description of the Related Art

Optical apparatuses such as lens apparatuses require not only good optical performance but also durability against an external force due to impact or the like. Japanese Patent Laid-Open Nos. 10-293238 and 2006-64930 each disclose a lens apparatus including an external force absorption structure.

The lens apparatus disclosed in Japanese Patent Laid-Open No. 10-293238 has a configuration in which a holding member that holds a first lens unit and a ring member to which an optical member such as a filter is attached and that is disposed in a front portion of an outer circumferential part of the holding member sandwich an adjustment member and a biasing member. In such a configuration, an external force applied to the ring member moves the ring member rearward to a position where the ring member is brought in contact with the adjustment member while compressing the biasing member, and thereby the external force is absorbed.

Furthermore, the lens apparatus disclosed in Japanese Patent Laid-Open No. 2006-64930 has a configuration in which a front side lens barrel holding a lens and a rear side lens barrel into which the front side lens barrel is movably inserted are each provided with a taper surface, and in which a first lens barrel is biased in an optical axis direction by a biasing member, whereby the taper surfaces of the front and rear side lens barrels are brought in contact with each other. This configuration absorbs not only an external force applied in the optical axis direction but also an external force applied in a direction orthogonal to the optical axis is absorbed.

However, in the configuration of the lens apparatus disclosed in Japanese Patent Laid-Open No. 10-293238, since the ring member is moved rearward with respect to the first lens unit held by the holding member and thereby the lens apparatus (especially a wide-angle lens apparatus having a wide angle of view) may be increased in size in its radial direction. That is, in order to prevent the ring member moved rearward from interfering with the first lens unit, it is necessary to dispose the ring member apart from the first lens unit in the radial direction. In a lens apparatus having a wide angle of view, since light rays having a large angle with respect to the optical axis enter a peripheral portion thereof, it is necessary to increase a diameter of the ring member in order to prevent vignetting of the light rays due to the ring member. As a result, the lens apparatus is increased in size in the radial direction.

Moreover, in the lens apparatus disclosed in Japanese Patent Laid-Open No. 2006-64930, positioning of the front side lens barrel holding the lens unit in the optical axis direction and in the direction orthogonal to the optical axis with respect to the rear side lens barrel is performed by the contact of the taper surfaces of the front and rear side lens barrels, which may decrease positioning accuracy.

BRIEF SUMMARY OF THE INVENTION

The present invention provides a compact lens apparatus having a structure which ensures a necessary positioning accuracy and enables absorbing an external force.

The present invention provides as one aspect thereof a lens apparatus including a first lens barrel holding a lens, a second lens barrel disposed on an image side further than an object side end portion of the first lens barrel in an optical axis direction and assembled to the first lens barrel so as to allow a movement of the first lens barrel in the optical axis direction, a driving member to move the first and second lens barrels in the optical axis direction, a positioning member attached to one lens barrel of the first and second lens barrels, and an elastic member disposed between the first and second lens barrels to bias the first lens barrel toward an object side with respect to the second lens barrel. Another lens barrel of the first and second lens barrels is brought in contact with the positioning member with a biasing force generated by the biasing member, and thereby the first lens barrel is positioned at a predetermined object side position with respect to the second lens barrel in a state where a movement of the first lens barrel on the image side due to an external force is allowed.

The present invention provides as another aspect thereof an image pickup apparatus including a main body to which the above lens apparatus is integrally fixed or detachably attached, and an image sensor capturing an object image formed by the lens apparatus.

Other aspects of the present invention will become apparent from the following description and the attached drawings.

DETAILED DESCRIPTION OF THE EMBODIMENTS

Exemplary embodiments of the present invention will hereinafter be described with reference to the accompanying drawings.

Embodiment 1

Figure 2:
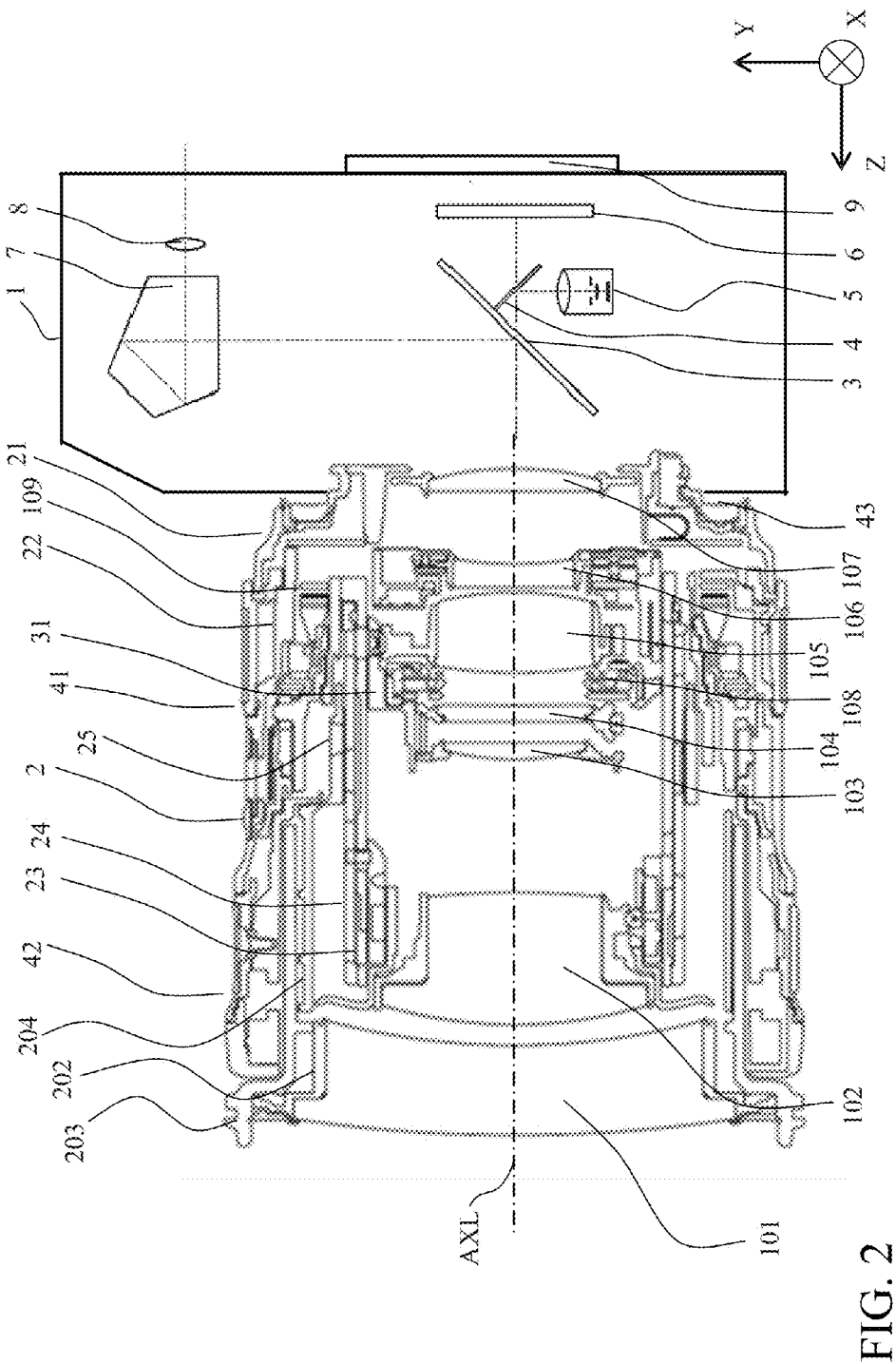
FIG. 2 is a sectional view of an image pickup apparatus to which the interchangeable lens of Embodiment 1 is attached.

FIG. 2 shows an interchangeable lens 2 as a lens apparatus that is a first embodiment (Embodiment 1) of the present invention and a digital single-lens reflex camera (hereinafter simply referred to as "a camera") 1 as an image pickup apparatus to which the interchangeable lens 2 is detachably attached. In FIG. 2, a direction to which an optical axis AXL of an image capturing optical system in the interchangeable lens 2 extends (hereinafter referred to as "an optical axis direction") is defined as a Z direction. A long side direction of an image sensor 6 (described later) among directions orthogonal to the optical axis AXL is defined as an X direction, and a short side direction thereof is defined as a Y direction. Moreover, in FIG. 2, a left side corresponds to an object side (subject side) in the optical axis direction (Z direction), and a right side corresponds to an image side. In the following description, the object side is also referred to as "a front side", and the image side as "a rear side."

First, description of a configuration of the camera 1 will be made. A main mirror 3 provided inside a main body of the camera 1 reflects part of a light flux from the interchangeable lens (image capturing optical system) 2 to introduce the reflected light to a viewfinder optical systems 7 and 8 and transmits a remaining part of the light flux in a state of being disposed in an optical path from the interchangeable lens 2, as shown in FIG. 2.

A sub mirror 4 is disposed behind the main mirror 3. The sub mirror 4 reflects the light flux transmitted through the main mirror 3 to introduce the reflected light flux to a focus detection unit 5. The main mirror 3 and the sub mirror 4 are moved into and out of the optical path by a driving mechanism (not shown). The focus detection unit 5 performs focus detection (detection of a focus state of the interchangeable lens 2) by a phase difference detection method.

The image sensor 6 is constituted by a charge-coupled device (CCD) sensor or a complementary metal-oxide semiconductor (CMOS) sensor. An object image (subject image) is formed on a light receiving surface (image pickup surface) of the image sensor 6 by the light flux from the interchangeable lens 2. The image sensor 6 performs photoelectric conversion of the object image to output an image pickup signal.

Reference numeral 9 denotes a display panel, which displays an image produced by a signal processor (not shown) that processes the image pickup signal from the image sensor 6 and various image capturing information.

Next, description of a configuration of the interchangeable lens 2 will be made. The image capturing optical system in the interchangeable lens 2 includes, in order from the object side to the image side, a first lens unit 101, a second lens unit 102, a third lens unit 103, a fourth lens unit 104, a fifth lens unit 105, a sixth lens unit 106 and a seventh lens unit 107. Moreover, the image capturing optical system includes an aperture stop 108 disposed between the fourth lens unit 104 and the fifth lens unit 105.

The first lens unit 101, the third lens unit 103, the fourth lens unit 104 and the fifth lens unit 105 are magnification varying lens units which perform variation of magnification by moving in the optical axis direction. The variation of magnification is performed by rotation of a cam barrel 24 about the optical axis in response to a rotational operation of a zoom operation ring 41. The second lens unit 102 is a focus lens unit which performs focusing by moving in the optical axis direction by receiving a driving power from a focus unit 109 or in response to a rotation operation of a focus operation ring 42.

The sixth lens unit 106 is an image stabilizing lens unit that receives a driving power from an image stabilizing unit to be shifted in pitch and yaw directions orthogonal to the optical axis AXL so as to reduce image blur. The aperture stop 108 changes its aperture diameter to adjust an amount of light entering the camera 1.

Reference numeral 21 denotes an exterior ring. A lens mount 43 detachable to a camera mount provided to the main body of the camera 1 is fixed in a rear end of the exterior ring 21. Reference numeral 22 denotes a fixed barrel disposed inside the exterior ring 21, which is fixed to the exterior ring 21. Reference numeral 23 denotes a guiding barrel disposed inside the fixed barrel 22, and a straight groove portion (straight guiding portion) extending in the optical axis direction is formed in the guiding barrel 23.

The cam barrel 24 is disposed between the fixed barrel 22 and the guiding barrel 23 in a state of being rotatable about the optical axis in contact with an outer circumferential part of the guiding barrel 23. A cam groove portion (cam portion) is formed in the cam barrel 24.

Reference numeral 203 denotes a front side lens barrel as a first lens barrel. A front portion of the front side lens barrel 203 is projected to a front side further than the exterior ring 21, and a rear portion thereof is disposed inside the fixed barrel 22. Reference numeral 202 denotes a first lens holding frame which holds the first lens unit 101 and which is attached to an inside area of the front portion of the front side lens barrel 203. Reference numeral 204 denotes a rear side lens barrel as a second lens barrel, which is disposed inside the rear portion of the front side lens barrel 203, that is, disposed at least on the image side further than a front end portion (object side end portion) of the front side lens barrel 203. The rear side lens barrel 204 is assembled to the front side lens barrel 203 so as to allow a movement of the front side lens barrel 203 in the optical axis direction, through an external force absorption structure (described later).

The front side lens barrel 203, the rear side lens barrel 204 and the first lens holding frame 202 constitute a first lens unit holding movable barrel which holds the first lens unit 101 and is movable in the optical axis direction in the interchangeable lens 2.

Reference numeral 25 denotes a cam follower which is attached to the rear side lens barrel 204 and is engaged with the cam groove portion of the cam barrel 24 and with a straight groove portion of the guiding barrel 23. When the cam barrel 24 is rotated in response to the rotation operation of the zoom operation ring 41, the cam follower 25 receives a driving power in the optical axis direction corresponding to a lift of the cam groove therefrom, and thereby the cam follower 25 is moved in the optical axis direction with being guided by the straight groove portion. Thus, the first lens unit holding movable barrel is moved in the optical axis direction together with the first lens unit 101. The cam follower 25, the cam barrel 24 and the guiding barrel 23 constitute a driving member that moves in the optical axis direction the first lens unit holding movable barrel including the front side lens barrel 203 and the rear side lens barrel 204.

However, the cam groove portion of the cam barrel 24 includes not only an area (first portion) that moves the first lens unit holding movable barrel by the above-described lift, but also another area (second portion) where the lift is 0 (that is, where an angle of a direction in which the cam groove portion extends with respect to the optical axis direction is 90°). In such zero lift area, a driving power is not given to the cam follower 25 even when the cam barrel 24 is rotated, and the first lens unit holding movable barrel is not moved in the optical axis direction.

When a rearward external force is applied to the front side lens barrel 203 in a state where the cam follower 25 is located in the zero lift area, the external force cannot be released by a movement of the cam follower 25 along the cam groove portion (by a rotation of the cam barrel 24), which may provide damage to the cam follower 25. Moreover, the cam follower 25 may be strongly pressed to a cam surface of the cam groove portion, whereby the cam surface may be scratched (or dented). Therefore, in this embodiment, an external force absorption structure is provided between the front side lens barrel 203 and the rear side lens barrel 204 in the first lens unit holding movable barrel.

Figure 1:
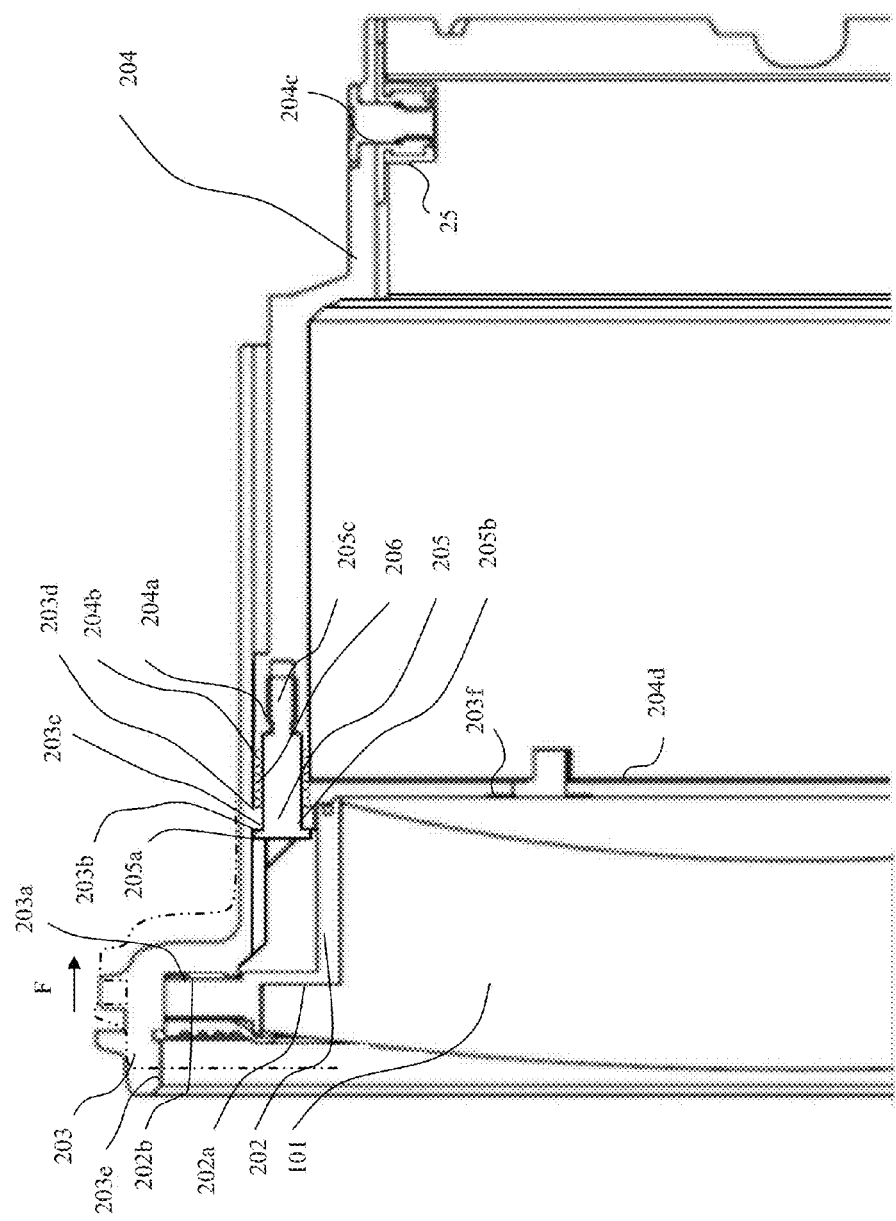
FIG. 1 is a sectional view of a configuration of an interchangeable lens that is Embodiment 1 of the present invention.

FIG. 1 shows, of the interchangeable lens 2 shown in FIG. 2, the front side lens barrel 203, the rear side lens barrel 204 and the first lens unit holding frame 202 holding the first lens unit 101 and shows a detailed configuration of the external force absorption structure. FIG. 1 shows a state (normal state) before the external force due to impact or the like is applied to the front end of the interchangeable lens 2.

The first lens holding frame 202 includes a lens holding portion 202a that holds the first lens unit 101 and a lens barrel attaching portion 202b that is attached to the front side lens barrel 203.

The front side lens barrel 203 includes a lens barrel holding portion 203a that holds the first lens holding frame 202 by attaching the lens barrel attaching portion 202b of the first lens holding frame 202 thereto. The front side lens barrel 203 further includes a stopper receiving portion 203b that makes contact with a stopper portion 205a provided in a positioning pin 205 (described later) as a positioning member, and a pin inserting hole portion 203c to which an intermediate shaft portion 205b of the positioning pin 205 is inserted. Moreover, the front side lens barrel 203 includes a spring receiving portion 203d that receives contact of a front end portion of a coil spring 206 (described later) as an elastic member.

Furthermore, the front end portion (object side end portion) of the front side lens barrel 203 projects to the front side further than the first lens unit 101 held by the first lens holding frame 202. In this front end portion of the front side lens barrel 203, a filter attaching portion 203e is provided to which an optical filter such as a protecting filter, an ND (neutral density) filter, a PL (polarization) filter can be detachably attached.

The rear side lens barrel 204 includes a female screw portion 204a as a positioning pin attaching portion to which a male screw portion (joining portion) 205c formed in the positioning pin 205 is attached (screwed) and a spring receiving portion 204b that receives contact of a rear end portion of the coil spring 206. In this embodiment, the rear side lens barrel 204 corresponds to "one lens barrel", and the front side lens barrel 203 corresponds to "the other lens barrel".

The rear side lens barrel 204 includes in its rear portion a follower attaching portion 204c to which the above-described cam follower 25 is attached. Although the front side and rear side lens barrels 203 and 204 are members to be moved in the optical axis direction for variation of magnification in this embodiment, these may be members to be moved in the optical axis direction for focusing.

The positioning pin 205 includes a stopper portion 205a as a contact portion formed at its front end so as to project in its radial direction, and a male screw portion 205c as a screwing portion formed in its rear portion. Furthermore, the positioning pin 205 includes a shaft portion 205b as an intermediate portion formed so as to extend in the optical axis direction between the stopper portion 205a and the male screw portion 205c. As described above, the male screw portion 205c is screwed (tightened) into the female screw portion 204a of the rear side lens barrel 204, whereby the positioning pin 205 is unified with the rear side lens barrel (other lens barrel) 204.

The coil spring 206 is disposed in a state of being compressed in the optical axis direction between the spring receiving portion 203d of the front side lens barrel 203 and the spring receiving portion 204b of the rear side lens barrel 204. The coil spring 206 biases the front side lens barrel 203 frontward with respect to the rear side lens barrel 204. In the normal state, the stopper receiving portion 203b of the front side lens barrel 203 is brought in contact (press contact) with the stopper portion 205a of the positioning pin 205 from the rear side by a biasing force of the coil spring 206, which prevents a further forward movement (detachment) of the front side lens barrel 203 with respect to the rear side lens barrel 204.

In the interchangeable lens 2 thus configured, the pin inserting hole portion 203c of the front side lens barrel 203 fits (engages) with the shaft portion 205b of the positioning pin 205 unified with the rear side lens barrel 204, whereby the front side lens barrel 203 is positioned in directions (in a plane) orthogonal to the optical axis with respect to the rear side lens barrel 204.

Moreover, the stopper receiving portion 203b of the front side lens barrel 203 is brought in contact with the stopper portion 205a of the positioning pin 205 by the biasing force of the coil spring 206 as described above. Thereby, the front side lens barrel 203 is positioned at a certain position in the optical axis direction with respect to the rear side lens barrel 204, so that the front end portion of the front side lens barrel 203 is located on the front side further than the rear side lens barrel 204.

The front side lens barrel 203 is allowed to move rearward with respect to the rear side lens barrel 204. Therefore, in an external force applied state where an external force F (such as a static external force or an impactive external force) is applied to the front side lens barrel 203 from its front side, as shown by two-dotted chain line in FIG. 1, the front side lens barrel 203 is moved rearward with compressing the coil spring 206 with respect to the positioning pin 205 and the rear side lens barrel 204, whereby the external force F is absorbed. Thus, the external force absorption structure (or an impact absorption structure) is configured.

The front side lens barrel 203 is provided with a rearward stopper portion 203f formed in its inner circumferential part. The rearward stopper portion 203f makes contact with a stopper receiving portion 204d provided in an inner circumferential part of the rear side lens barrel 204 when the front side lens barrel 203 is moved rearward by a certain amount with respect to the rear side lens barrel 204 by the external force F, which stops the front side lens barrel 203 from moving further rearward. This configuration prevents the first lens unit 101 from interfering the second lens unit 102 disposed on the image side further than the front side lens barrel 203 and prevents the coil spring 206 from being excessively compressed.

Figure 3:
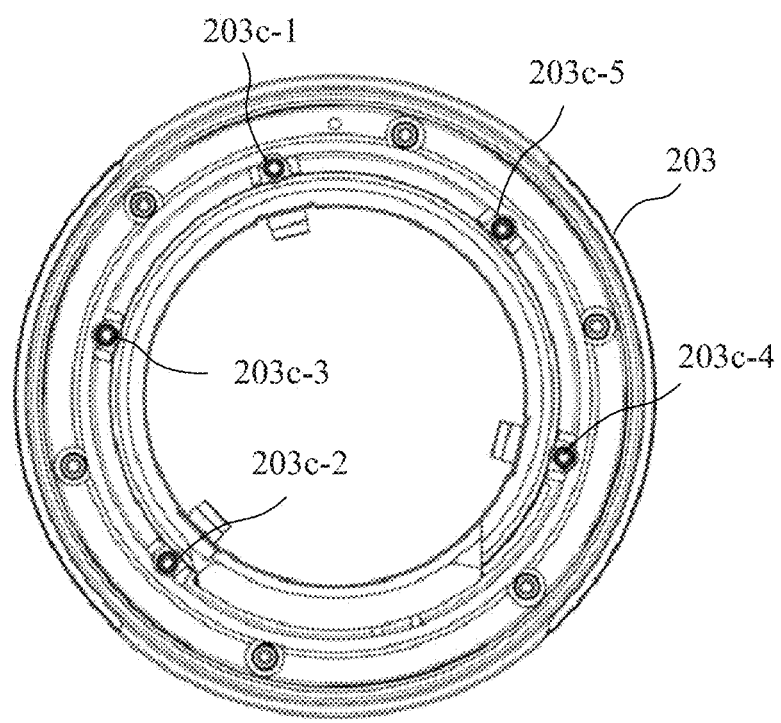
FIG. 3 is a front view of the interchangeable lens of Embodiment 1.

FIG. 3 shows the front side lens barrel 203 viewed from the object side. The pin inserting hole portion 203c shown in FIG. 1 is provided at multiple circumferential positions (five positions in this embodiment) 203c-1 to 203c-5 in the front side lens barrel 203. The shaft portion 205b of the positioning pin 205 shown in FIG. 1 is inserted into each of the pin inserting hole portions 203c-1 to 203c-5. One pin inserting hole portion 203c-1 among the pin inserting hole portions 203c-1 to 203c-5 has a round hole shape. The pin inserting hole portion 203c-1 corresponds to the pin inserting hole portion 203c shown in FIG. 1 and fits (engages) with the entire outer periphery of the shaft portion 205b of the positioning pin 205 inserted thereinto.

Another pin inserting hole portion 203c-2 has an elongated hole shape in which a certain radial direction (vertical direction in FIG. 2) is its longitudinal direction. The pin inserting hole portion 203c-2 engages with the shaft portion 205b of the positioning pin 205 inserted thereinto at its both side portions in a width direction orthogonal to the longitudinal direction (that is, part of the outer periphery of the shaft portion 205b). Thereby, the pin inserting hole portion 203c-2 allows a displacement (movement) of the front side lens barrel 203 in the longitudinal direction. Thus, the front side lens barrel 203 is positioned in the plane orthogonal to the optical axis with respect to the rear side lens barrel 204. The other pin inserting hole portions 203c-3 to 203c-5 each form a certain gap with the entire outer periphery of the shaft portion 205b of the positioning pin 205 inserted thereinto. That is, the pin inserting hole portions 203c-3 to 203c-5 each have an inner diameter so as not to engage with the outer periphery of the shaft portion 205b.

The above described coil spring 206 is disposed so as to surround the outer periphery of the shaft portion 205b of the positioning pin 205 inserted into each of the pin inserting hole portions 203c-1 to 203c-5. Disposing the multiple coil springs 206 at the outer peripheries of the multiple positioning pins 205 makes it possible to miniaturize the front side and rear side lens barrels 203 and 204, as compared with a case where one coil spring having a large diameter which can make contact with the entire inner circumferential part of the front side lens barrel 203.

In the case where the one coil spring having a large diameter is used, the positioning pins 205 are required to be disposed apart from each other in the optical axis direction or in the radial direction so as to prevent the coil spring from overlapping with the positioning pins 205 in the radial direction. As a result, the front side and rear side lens barrels 203 and 204 are undesirably increased in size in the optical axis direction or in the radial direction.

When the front side lens barrel 203 and the rear side lens barrel 204 are assembled, for example, the coil springs 206 are first disposed behind the pin inserting hole portions 203c-1 to 203c-5 of the front side lens barrel 203, and the front end portions of the coil springs 206 are made contact with the spring receiving portions 203d of the front side lens barrel 203. Then, the rear side lens barrel 204 is inserted inside the front side lens barrel 203 from the rear side, and the spring receiving portions 204b of the rear side lens barrel 204 are made contact with the rear end portions of the coil springs 206.

Next, the positioning pins 205 are inserted into the pin inserting hole portions 203c-1 to 203c-5 respectively, and the male screw portions 205c of the positioning pins 205 are screwed to the female screw portions 204a of the rear side lens barrel 204. Thereafter, the first lens holding frame 202 holding the first lens unit 101 is attached to the front side lens barrel 203.

Although the coil spring 206 is used as the elastic member in this embodiment, other elastic members such as a plate spring may alternatively be used.

Moreover, although this embodiment described the case where the positioning pin 205 is attached to the rear side lens barrel 204, the positioning pin 205 may alternatively be attached to the front side lens barrel 203. That is, the positioning pin 205 has only to be attached to either one of the front side lens barrel 203 and the rear side lens barrel 204. In that case, the shaft portion 205c of the positioning pin 205 unified with the front side lens barrel 203 fits with pin inserting hole portion of the rear side lens barrel 204, which positions the front side lens barrel 203 in the plane orthogonal to the optical axis with respect to the rear side lens barrel 204. Furthermore, the rear side lens barrel 204 is brought in contact with a stopper portion provided in the positioning pin 205 by the biasing force of the coil spring 206, which positions the front side lens barrel 203 in the optical axis direction with respect to the rear side lens barrel 204.

Embodiment 2

Figure 4:
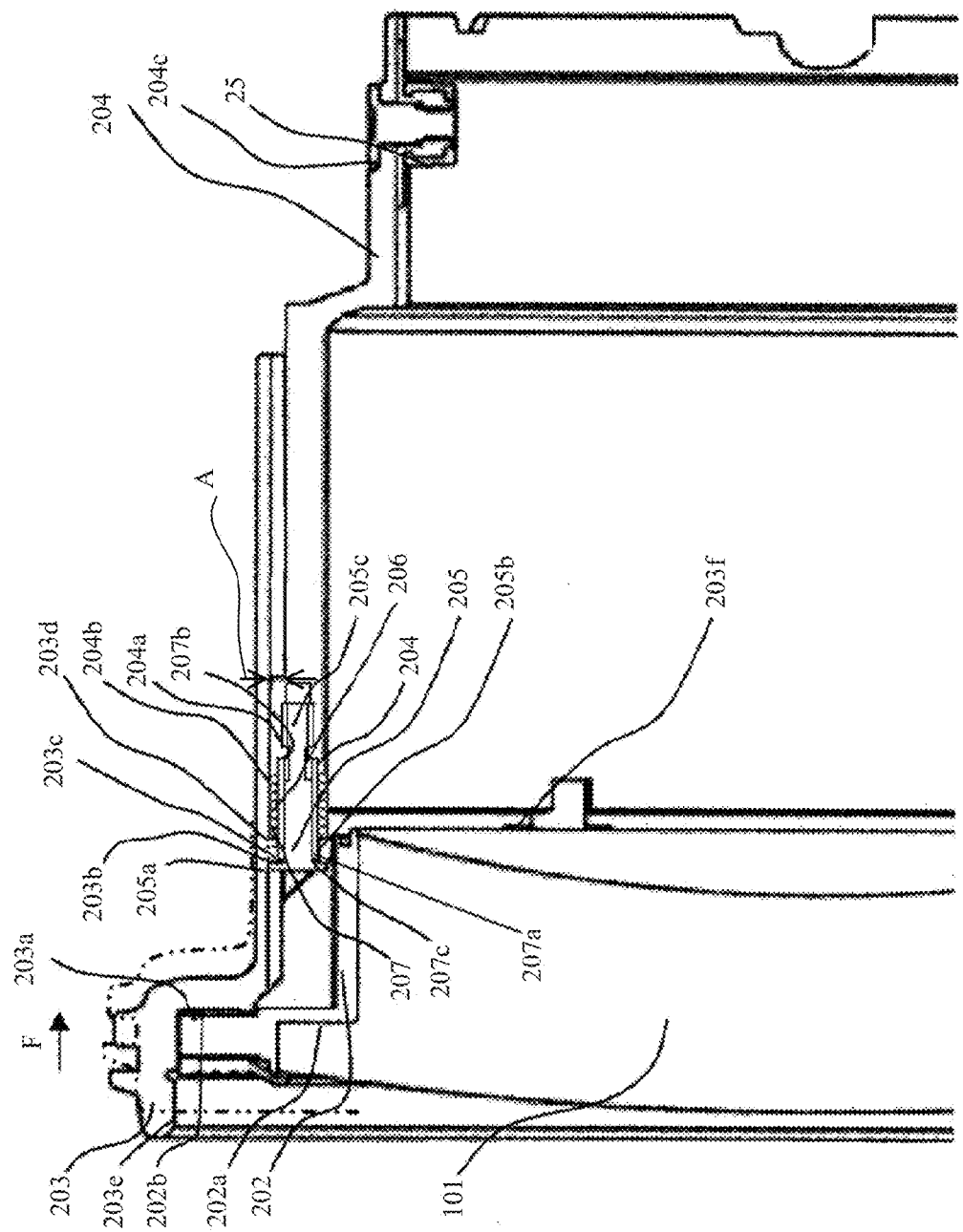
FIG. 4 is a sectional view of an interchangeable lens that is Embodiment 2 of the present invention.

FIG. 4 shows a front side lens barrel 203 and a rear side lens barrel 204 including an external force absorption structure in an interchangeable lens that is a second embodiment (Embodiment 2) of the present invention. In this embodiment, constituent elements common to those in Embodiment 1 are denoted by same reference numerals as those in Embodiment 1, and description thereof is omitted. This embodiment will mainly describe differences from Embodiment 1.

A front portion 207a of a sleeve member 207 formed cylindrically as a second positioning member is inserted into a pin inserting hole portion 203c of the front side lens barrel 203. Furthermore, a positioning pin 205 as a first positioning member is inserted inside the sleeve member 207.

The sleeve member 207 has a rearward extending portion extending rearward from the front portion 207a, and a coil spring 206 is disposed at an outer periphery of the rearward extending portion. A rear portion 207b of the sleeve member 207 is inserted (press-fitted) into a hole portion 204e formed in front of a female screw portion 204a formed in the rear side lens barrel 204, and a rear end face of the rear portion 207b makes contact with a bottom face of the hole portion 204e. On the other hand, a front end face 207c of the sleeve member 207 makes contact with a stopper portion 205a of the positioning pin 205. The sleeve member 207 forms an intermediate portion which allows a movement of the front side lens barrel 203 in the optical axis direction.

In this embodiment, the pin inserting hole portion 203c of the front side lens barrel 203 fits (engages) with the front portion 207a of the sleeve member 207 press-fitted into the hole portion 204e of the rear side lens barrel 204, which positions the front side lens barrel 203 in a plane orthogonal to the optical axis with respect to the rear side lens barrel 204. Furthermore, the rear end face of the sleeve member 207 makes contact with the bottom face of the hole portion 204e of the rear side lens barrel 204 and the front end face 207c of the sleeve member 207 makes contact with the stopper portion 205a of the positioning pin 205, which positions the positioning pin 205 (stopper portion 205a) in the optical axis direction with respect to the rear side lens barrel 204. Thus, contact of a stopper receiving portion 203b of the front side lens barrel 203 biased forward by a coil spring 206 with the stopper portion 205a of the positioning pin 205 from the rear side positions the front side lens barrel 203 in the optical axis direction with respect to the rear side lens barrel 204.

Also in the this embodiment, in an external force applied state where an external force F is applied to the front side lens barrel 203 from the front side, as shown by a two-dotted chain line in FIG. 4, the front side lens barrel 203 is moved rearward with compressing the coil spring 206 with respect to the sleeve member 207, the positioning pin 205 and the rear side lens barrel 204, and thereby the external force F can be absorbed.

In this embodiment, when assembly is made, the rear portion 207b of the sleeve member 207 is first press-fitted into the hole portion 204e of the rear side lens barrel 204, whereby the rear end face of the sleeve member 207 is made contact with the bottom face of the hole portion 204e and the sleeve member 207 is held by the rear side lens barrel 204. Thereafter, the coil spring 206 is disposed at an outer periphery of the sleeve member 207, and then the rear side lens barrel 204 is assembled inside the front side lens barrel 203 from the rear side. In this assembly, the front portion 207a of the sleeve member 207 is fitted into the pin inserting hole portion 203c of the front side lens barrel 203.

Next, the positioning pin 205 is inserted inside the sleeve member 207 from the front side, and a male screw portion 205c thereof is screwed into the female screw portion 204a of the rear side lens barrel 204 until the stopper portion 205a makes contact with the front end face 207c of the sleeve member 207. Providing the sleeve member 207 and disposing the coil spring 206 at the outer periphery thereof makes it possible to prevent the coil spring 206 from dropping off when the assembly is made, which improves ease of assembly as compared with Embodiment 1.

Moreover, in Embodiment 1, it is necessary to accurately manage a screwing amount of the positioning pin 205 (male screw portion 205c), which has the function of positioning of the front side lens barrel 203 in the optical axis direction, with respect to the rear side lens barrel 204 (female screw portion 204a). This management of the screwing amount may deteriorate ease of assembly. However, in this embodiment, the screwing amount of the positioning pin 205 with respect to the rear side lens barrel 204 is limited by the sleeve member 207, which eliminates the necessity of the management of the screwing amount required in Embodiment 1, thereby enabling improving the ease of assembly.

Furthermore, in this embodiment, the front side lens barrel 203 is disposed so as to have an appropriate clearance A between an inner circumferential surface thereof and an outer circumferential surface of the rear side lens barrel 204. This configuration allows the front side lens barrel 203 to move rearward with respect to the rear side lens barrel 204 with a tilt to the optical axis. As a result, even when an external force causing the front side lens barrel 203 to tilt with respect to the optical axis is applied, such an external force can be absorbed.

As described above, each embodiment achieves a compact lens apparatus securing good positioning accuracy of the front side lens barrel with respect to the rear side lens barrel and enabling effective absorption of the external force due to impact and the like while having a simple configuration.

Although each embodiment described the lens apparatus as the interchangeable lens detachably attachable to the image pickup apparatus, the configuration described in each embodiment can be applied also to a lens apparatus (lens barrel) to be mounted on a lens integrated image pickup apparatus.

Furthermore, the present invention is not limited to these embodiments and various variations and modifications may be made without departing from the scope of the present invention.

This application claims the benefit of Japanese Patent Application No. 2012-239749, filed on Oct. 31, 2012, which is hereby incorporated by reference herein in its entirety.

What is claimed is:

1. A lens apparatus comprising:
   a first lens barrel holding a lens;
   a second lens barrel disposed on an image side further than an object side end portion of the first lens barrel in an optical axis direction and assembled to the first lens barrel so as to allow a movement of the first lens barrel in the optical axis direction;
   a driving member that moves the first and second lens barrels in the optical axis direction;
   a positioning member fixed to one of the first or second lens barrel; and
   an elastic member disposed between the first and second lens barrels and that generates a biasing force to bias the first lens barrel toward an object side from the second lens barrel,
   wherein the biasing force brings the other of the first or second lens barrel in contact with the positioning member to position the first lens barrel at a predetermined object side position with respect to the second lens barrel in a state where a movement of the first lens barrel on the image side due to an external force is allowed.

2. A lens apparatus according to claim 1, wherein the positioning member includes:
   a joining portion to be joined to the one of the first or second lens barrel;
   a contact portion with which the other of the first or second lens barrel is brought in contact with the biasing force from the elastic member; and
   an intermediate portion disposed between the joining portion and the contact portion to allow the movement of the first lens barrel in the optical axis direction.

3. A lens apparatus according to claim 2, wherein the positioning member comprises:
   a first positioning member including the joining portion and the contact portion; and
   a second positioning member disposed at an outer periphery of a portion between the joining portion and the contact portion to form the intermediate portion,
   wherein the second positioning member is brought in contact with the contact portion and with the one of the first or second lens barrel to position the first positioning member with respect to the one of the first or second lens barrel in the optical axis direction.

4. A lens apparatus according to claim 2, wherein:
   the positioning member is fixed to each of multiple circumferential places of the one of the first or second lens barrel,
   the other of the first or second lens barrel includes, at multiple circumferential places, hole portions into which the intermediate portions of the respective positioning members are inserted,
   one of the hole portions engages with an entire outer periphery of one of the intermediate portions, another one of the hole portions engages with part of an outer periphery of another one of the intermediate portions, and at least one of the remaining hole portions forms a gap with an entire outer periphery of at least one of the remaining intermediate portions.

5. A lens apparatus according to claim 2, wherein the elastic member is disposed surrounding an outer periphery of the intermediate portion.

6. A lens apparatus according to claim 1, wherein the driving member comprises:
   a cam follower provided in the second lens barrel;
   a cam barrel provided with a cam portion with which the cam follower is engaged and whose rotation about an optical axis moves the first and second lens barrels through the cam follower in the optical axis direction; and
   a guiding barrel engaging with the cam follower to guide the cam follower in the optical axis direction.

7. A lens apparatus according to claim 6, wherein the cam portion includes:
   a first portion configured to move the first and second lens barrels through the cam follower in the optical axis direction with the rotation of the cam barrel; and
   a second portion configured to not move the first and second lens barrels through the cam follower in the optical axis direction with the rotation of the cam barrel.

8. A lens apparatus according to claim 1, wherein the first lens barrel is provided with a rearward stopper that makes contact with a stopper receiving portion provided in the second lens barrel to stop a further movement of the first lens barrel toward the image side after the first lens barrel is moved by the external force with respect to the second lens barrel toward the image side by a predetermined amount.

9. A lens apparatus according to claim 1, wherein:
   the first lens barrel includes a front end portion that is an object side end portion, and the front end portion protrudes on the object side further than the lens.

10. A lens apparatus according to claim 9, wherein the front end portion of the first lens barrel is provided with a filter attaching portion to which an optical filter is detachably attachable.

11. An image pickup apparatus comprising:
    a main body to which a lens apparatus is integrally fixed or detachably attached; and an image sensor that captures an object image formed by the lens apparatus, wherein the lens apparatus comprises:

a first lens barrel holding a lens;

a second lens barrel disposed on an image side further than an object side end portion of the first lens barrel in an optical axis direction and assembled to the first lens barrel to allow a movement of the first lens barrel in the optical axis direction;

a driving member that moves the first and second lens barrels in the optical axis direction;

a positioning member attached to one of the first or second lens barrel; and an elastic member disposed between the first and second lens barrels and that generates a biasing force to bias the first lens barrel toward an object side with respect to the second lens barrel, wherein the biasing force brings the other of the first or second lens barrel in contact with the positioning member to position the first lens barrel at a predetermined object side position with respect to the second lens barrel in a state where a movement of the first lens barrel on the image side due to an external force is allowed.

12. A lens apparatus comprising:

a first lens barrel holding a lens;

a second lens barrel disposed on an image side further than an object side end portion of the first lens barrel in an optical axis direction and assembled to the first lens barrel to allow a movement of the first lens barrel in the optical axis direction;

a driving member that moves the first and second lens barrels in the optical axis direction;

a positioning member attached to one of the first or second lens barrel; and an elastic member disposed between the first and second lens barrels and that generates a biasing force to bias the first lens barrel toward an object side from the second lens barrel while the biasing force does not act to the driving member, wherein the biasing force brings the other of the first or second lens barrels in contact with the positioning member to position the first lens barrel at a predetermined object side position with respect to the second lens barrel in a state where a movement of the first lens barrel on the image side due to an external force is allowed.

13. An image pickup apparatus comprising:

a main body to which a lens apparatus is integrally fixed or detachably attached; and an image sensor that captures an object image formed by the lens apparatus, wherein the lens apparatus comprises:

a first lens barrel holding a lens;

a second lens barrel disposed on an image side further than an object side end portion of the first lens barrel in an optical axis direction and assembled to the first lens barrel to allow a movement of the first lens barrel in the optical axis direction;

a driving member that moves the first and second lens barrels in the optical axis direction;

a positioning member attached to one of the first or second lens barrel; and an elastic member disposed between the first and second lens barrels and that generates a biasing force to bias the first lens barrel toward an object side from the second lens barrel while the biasing force does not act to the driving member, wherein the biasing force brings the other of the first or second lens barrel in contact with the positioning member to position the first lens barrel at a predetermined object side position with respect to the second lens barrel in a state where a movement of the first lens barrel on the image side due to an external force is allowed.

* * * * *